Jan. 21, 1964     I. D. PRESS     3,118,691
HOSE FITTING
Filed Jan. 15, 1960
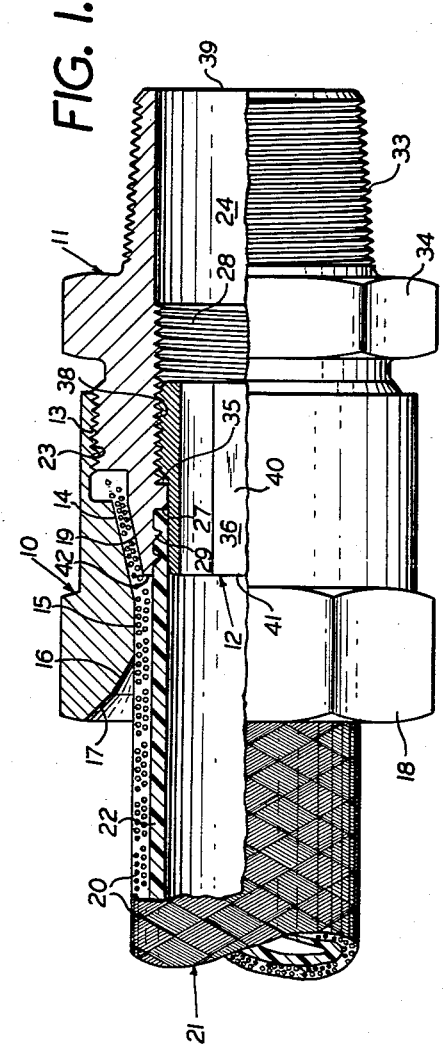
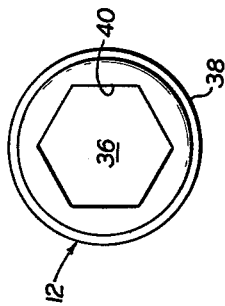
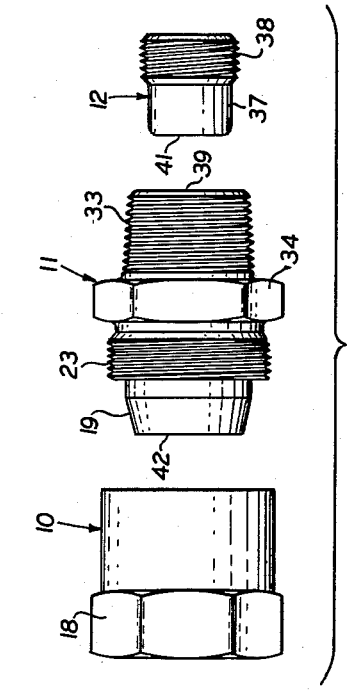
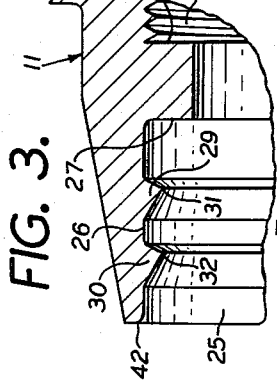
INVENTOR
IRVING D. PRESS
BY
Byerly, Townsend,
Watson & Churchill
ATTORNEYS.

United States Patent Office 3,118,691
Patented Jan. 21, 1964

3,118,691
HOSE FITTING
Irving D. Press, West Orange, N.J., assignor to Resistoflex Corporation, Roseland, N.J., a corporation of New York
Filed Jan. 15, 1960, Ser. No. 2,785
4 Claims. (Cl. 285—149)

The present invention relates to a hose end fitting and more particularly to a fitting for use with a hose having a tube of substantially inelastic plastic material and a braided covering thereon.

At the present time hose consisting of polytetrafluoroethylene (P.T.F.E.) tubing jacketed with braided steel wire is in widespread use on aircraft and missiles where rugged temperature, pressure and chemically resistant qualities are required. These hose lines are used at pressures ranging up to thousands of pounds per square inch dependent upon size and at temperatures up to 500° F. or higher. To ensure against leakage or blow-off, the end fittings, particularly in view of the unusual characteristics of P.T.F.E., had to be developed specially for use with this type of hose. Both permanent swaged and reusable unswaged fittings are currently in use. With swaged fittings the assembly is inherently tamper-proof; that is, it cannot be loosened inadvertently. However, the reusable fittings are assembled by hand tools, and even the skilled mechanics of the aircraft industry are reported on occasion to have inadvertently loosened when they thought they were tightening a fitting.

For general industrial use, flexible metal hose is currently employed where the operating conditions are such as to make rubber hose or the like unsatisfactory. These lines often go on equipment used by operators unskilled in their maintenance and repair. An example of a typical use is for steam lines on clothes pressing machines of the type used by commercial laundries. Of course, steam lines have widespread use, but the laundry field is considered typical.

In order to provide the maintenance department of a commercial laundry establishment with replacement lines it is most convenient to supply them with bulk hose and reusable end fittings. It should be appreciated that tamper-proof fittings are absolutely essential.

P.T.F.E. hose has a much greater flex life than flexible metal hose and, therefore, could advantageously supplant metal hose in the type of usage referred to above. The problem is to provide a tamper-proof fitting for such hose which can be easily assembled by unskilled personnel with complete safety.

A fitting which is intended for use on P.T.F.E. hose is described and illustrated in United States Patent No. 2,833,567, issued on May 6, 1958. Unfortunately, it has been found that this fitting is easily tampered with and is costly to manufacture. It employs a socket for surrounding the braided covering, a nipple for insertion in the tube and for coupling to a mating fitting, and an insert which is held in place by the nipple for maintaining a grip upon the braided covering. When the fitting is coupled to a mating component the nipple is immobilized. If through any cause the socket should unscrew even slightly from the nipple, pressure on the insert will be released and the grip on the braided covering will be lost. As clearly stated in the patent, the grip upon the P.T.F.E. liner or tube provides no appreciable retention of the hose against axial separation from the fitting. As a consequence, the fittings will blow off if improperly assembled or inadvertently loosened.

In my prior United States Patent No. 2,853,319, issued on September 23, 1958, there is described a fitting which has a "lock-nut" feature and which cannot be separated from the hose without complete disassembly. A modification of this fitting has been used with success on aircraft installations. However, this type of fitting requires the development of a fluid seal between engaging metal surfaces of the nipple and the insert. Costly machining similar to that encountered in the fitting of Patent No. 2,833,567 is required to avoid leakage.

The specification of Patent No. 2,833,567 stresses the fact that the annular ribs on the insert which engage the outer surface of the end of the hose liner or tube have a projection which is only a small fractional part of the wall thickness of the tube and develop only superficial deformation thereof. Others have expressed the opinion that compression cannot be maintained on the end of the P.T.F.E. tube because of alleged "aging" and "flow" of the resin particularly at the upper end of the operating temperature range. It is known that P.T.F.E. is subject to cold flow and it has been contended that the P.T.F.E. extrudes from between the nipple and the insert if any pressure is exerted thereon.

Therefore, with the state of the art as noted, it was discovered that if the height of the annular ribs were increased, say two or three times that specified in Patent No. 2,833,567, a grip on the tube could be developed which would resist separation of the fitting from the hose at pressures up to as much as 1000 p.s.i. depending upon the size of the fitting, even though the assembly was subjected to extended baking at 450° F. Using this discovery, a new fitting has been developed which is effectively tamper-proof and does not rely upon a metal-to-metal seal in its operation. Not requiring as much special machining, it is more economical to produce than the fittings now in use.

In accordance with the present invention, the part of the fitting which is to be inserted between the ends of the tube and the braided covering is made integral with and a part of a body member which also carries the means for joining the fitting to a mating part. The nipple is now made in the form of a "hidden" sleeve which threads into the body member and is inaccessible when the assembly is in use. Now, less care need be taken to ensure that the socket does not loosen so as to release the grip upon the braided covering.

More particularly, in accordance with the invention, there is provided a tamper-proof fitting of the type that can be attached with basic tools to the end of a hose having a tube of substantially inelastic plastic material and a braided covering thereon, said fitting comprising a socket with an internally threaded section and an internal conical gripping surface adapted to surround said covering, a body member with one end formed with an external conical gripping surface for cooperating in spaced relationship with said internal gripping surface and adapted to be positioned between the ends of said tube and said covering, external thread means on said body member adapted to be screwed into the threaded section of said socket for moving said body member into said socket into said spaced relationship for gripping the end of the covering between said conical gripping surfaces, a fluid passage through said body member with internal threads formed over at least a median region, the other end of said body member being arranged for coupling to a mating fitting, a nipple with a fluid passage therethrough and an end for entering the end of said tube, said nipple having external thread means over a section thereof for engaging said internal threads on the body member upon insertion in the passage of the body member from the said other end thereof, tool engaging means on said nipple for enabling the use of a torque imparting tool for threading the nipple into the body member against resistance due to compression of the end of the tube between the nipple and the body member, means for arresting the insertion of said nipple when the end which enters the tube is approximately opposite the end of said body member, the external diameter of the nipple over the portion which enters the tube being less than the internal diameter of the body member where it overlies the tube, and at least one annular rib formed on the interior wall of said body member where it overlies the tube, said rib extending radially inwardly to terminate in a relatively sharp edge and having a sufficient height so as to embed in the wall of said tube and obtain a grip thereupon adequate to resist separation of the fitting from the hose should the grip upon the covering be lost.

The invention will be better understood after reading the following detailed description of a preferred embodiment thereof with reference to the appended drawings in which:

FIG. 1 is a longitudinal half-section of a hose end with improved fitting attached;

FIG. 2 is an exploded view on a reduced scale of the parts of the novel fitting;

FIG. 3 is an enlarged fragmentary sectional view of the counterbore section of the body member showing the annular ribs in detail; and FIG. 4 is an end view of the nipple showing the tool engaging surfaces.

Referring now to the drawing wherein the same reference numerals are used to designate the same parts throughout, the fitting is shown as consisting of three principal parts, a socket 10, a body member 11, and a nipple 12.

The socket 10 is provided with an internally threaded section 13 and an internal conical gripping surface 14, the latter terminating in a cylindrical surface 15. Two conical surfaces 16 and 17 of different slope cooperate to provide a bell mouth for the socket. If desired, these two surfaces could be replaced by a smooth radius. Wrench engaging flats 18 are provided on the socket at the end remote from its internally threaded section 13, i.e., adjacent the bell mouth.

The body member 11 has one end formed with an external conical gripping surface 19 for cooperating in spaced relationship with the internal gripping surface 14 of the socket, as shown, to grip the braided covering 20 of the hose 21. The end of the member 11 bearing the surface 19 is adapted to be positioned between the ends of the tube 22 of substantially inelastic material and the covering 20. The fitting is particularly suited for use with a hose having a tube of P.T.F.E. and a covering of braided steel wires.

External thread means 23 are provided on the body member 11 adjacent the surface 19 adapted to be screwed or threaded into the threaded section 13 of the socket 10 for moving the body member into the socket in the spaced relationship for gripping the end of the braided covering 20.

A fluid passage 24 is provided through the body member 11 terminating at the end bearing the surface 19 in a cylindrical counterbore 25 having a lateral wall 26 and a bottom wall 27. The passage 24 also has internal threads 28 formed over at least a median region, as shown, and terminating in a shoulder 35.

At least one annular rib, two ribs 29 and 30 being illustrated by way of example, is formed on the lateral wall 26 of the counterbore 25 intermediate the ends thereof, i.e., between the bottom wall 27 and the end of the body member. The ribs 29 and 30 are buttress shape and extend radially inwardly to terminate in a relatively sharp edge 31 and 32, respectively. The other end of the body member 11 is arranged for coupling to a mating fitting. For purpose of illustration it is shown as a conventional male member with a tapered thread 33 and wrench flats 34. A female connector may be substituted when desired.

The nipple 12 is provided with a central bore or fluid passage 36 throughout its length. A relatively smooth outer surface 37 is provided along one end for entering the end of the tube 22 for a distance substantially equal to the axial length of the counterbore 25. External thread means 38 are formed along the other end of the nipple 12 for engaging the internal threads 28 in the body member 11 upon insertion of the nipple in the passage 24 from the end 39 thereof. As best seen in FIG. 4, the bore of this nipple 12 is broached to provide tool engaging surfaces or means 40 for enabling the use of a torque imparting tool, e.g., an internal hexagon wrench, for threading the nipple into the body member against the resistance due to compression of the end of the tube 22. The shoulder 35 in the passage 24 of the body member functions as a means for arresting the insertion of the nipple when the end 41 which enters the tube 22 is approximately opposite the end 42 of the body member 11.

In accordance with the invention the height of the annular ribs 29 and 30 is proportioned relative to the radial clearance between the lateral wall 26 of the counterbore and the surface 37 of the nipple 30 as to embed in the wall of the tube 22. In order to provide an appreciable resistance to separation of the fitting from the hose (this may equal or exceed rated operating pressure), should the grip upon the covering 30 be lost, the rib height (the distance between the respective edges 31, 32 and the lateral wall 26) should be equal to at least 20% of the wall thickness of the tube 22 of the hose for which the fitting is intended. It should be understood that in order to provide optimum results, a hose fitting must be dimensioned with a particular size hose in mind. With P.T.F.E. hose it has been found that comparatively close tolerances must be adhered to both in the manufacture of the hose and the fitting.

At the other end of the range, ribs having a height in excess of 40% of the tube wall thickness have been used successfully. The main consideration is avoidance of penetration to the extent that severance of the end of the tube takes place under pressure when the fitting is supposed to resist axial separation.

Another surprising discovery concerning this fitting is that for fluid sealing purposes, contrary to what is taught in Patent No. 2,833,567, it is not necessary to achieve compression between the nipple and the socket. The grip upon the end of the tube 22 has been found adequate to seal against vacuum and low pressure in addition to high pressure.

In dimensioning the parts of the fitting the outer surface 37 of the nipple may have a diameter equal to the inside diameter of the tube 22. The diameter of the lateral wall 26 of the counterbore may be equal to or slightly greater than the outside diameter of the tube 22. Thus, the sole cause for interference between the fitting and the tube 22 is the presence of the ribs 29 and 30. The clearance between the lateral wall 26 and the surface 37 of the nipple may safely exceed the wall thickness of the tube without requiring a change in the height of the ribs. This is believed to be due to the fact that the tube is pressed radially outwardly in use by the fluid pressure until the ribs are fully embedded even though maximum penetration may not be achieved during assembly of the fitting on the hose.

In the embodiment illustrated, the socket has an internal cylindrical surface 15 which is positioned beyond the ends of the body member and nipple. This surface 15 may have a diameter equal to or slightly larger than the outside diameter of the hose and functions to straighten or orient the hose relative to the fitting. Because of the relatively short axial length of the counterbore 25 and conical gripping surfaces (a counterbore length of less than 3/16 inch has been successfully used with a hose having an outside diameter of approximately 9/16 inch) the hose could readily be assembled at an angle to the fitting in the absence of the socket extension. Although the assembly would still function satisfactorily it would have an adverse psychological effect on those using it.

The fitting is secured to the hose by first placing the socket upon the hose, the bell mouth facilitating insertion of the steel wire hose covering. With the socket pushed beyond the end of the hose, the body member is inserted. The tube 22 is free to contract and easily enters the counterbore until it engages the bottom wall 27. The socket is now worked back until the threads 13 and 23 engage. Continued threading will bring the conical gripping surfaces into gripping relationship with respect to the braided covering 20.

Now the nipple is inserted in the passage of the body member until their threads engage. The threads 28 in the passage are made of such axial length that substantial engagement is developed between them and the threads 38 before the end 41 of the nipple starts to enter the tube 22. It must be remembered that the tube 22 is substantially inelastic and considerable resistance is encountered by the nipple. However, the mechanical advantage of the threads and the use of a torque imparting tool enable installation of the nipple until the shoulder 35 on the body member is encountered.

Tests have established that with the foregoing assembly, the socket 10 can be completely unscrewed and separated from the body member without causing a —5 fitting to separate from the hose under as much as 1000 p.s.i. pressure after baking for one hour at a temperature of 450° F. So long as the socket remains properly assembled however, there is a considerable margin of extra safety. The nipple because it is concealed within the body member is inaccessible to tampering even inadvertently except when the hose is disconnected from the mating device.

By making the coupling end of the fitting integral with the tapered section which fits between the tube and the covering, any fluid passing between the outer surface 37 of the nipple and the tube 22 will, if it passes between the engaging threads 28 and 38, be returned to the main fluid path. Thus, it is unnecessary to develop a leakproof metal-to-metal seal between the nipple and the body member.

The invention has been described with reference to a preferred embodiment thereof. It will be understood by those skilled in the art that numerous changes may be made in the specific structure without departing from the true spirit of the invention as defined in the appended claims.

What is claimed is:

1. A tamper-proof fitting of the type that can be attached with basic tools to the end of a hose having a tube of substantially inelastic plastic material and a braided covering thereon, said fitting comprising a socket with an internally threaded section and an internal conical gripping surface adapted to surround said covering, a body member with one end formed with an external conical gripping surface for cooperating in spaced relationship with said internal gripping surface and adapted to be positioned between the ends of said tube and said covering, external thread means on said body member adapted to be screwed into the threaded section of said socket for moving said body member into said socket into said spaced relationship for gripping the end of the covering between said conical gripping surfaces, a fluid passage through said body member with internal threads formed over at least a median region, the other end of said body member being arranged for coupling to a mating fitting, a nipple with a fluid passage therethrough and an end for entering the end of said tube, said nipple having external thread means over a section thereof for engaging said internal threads on the body member upon insertion in the passage of the body member from the said other end thereof, tool engaging means on said nipple for enabling the use of a torque imparting tool for threading the nipple into the body member against resistance due to compression of the end of the tube between the nipple and the body member, means for arresting the insertion of said nipple when the end which enters the tube is approximately opposite the end of said body member, said nipple being arranged to be wholly contained within said fluid passage of the body member whereby any fluid passing between the outer surface of the nipple and the inner surface of the tube will be provided with a return path to the main fluid path between the internal threads on said body member and the external thread means on said nipple, the external diameter of the nipple over the portion which enters the tube being less than the internal diameter of the body member where it overlies the tube, and at least one annular rib formed on the interior wall of said body member where it overlies the tube, said rib extending radially inwardly to terminate in a relatively sharp edge and having a sufficient height so as to embed in the wall of said tube and obtain a grip thereupon adequate to resist separation of the fitting from the hose should the grip upon the covering be lost, the cooperation between body member and nipple being such as to establish additionally a fluid seal on the end of the tube.

2. A tamper-proof fitting of the type that can be attached with basic tools to the end of a hose having a tube of substantially inelastic plastic material and a braided wire covering thereon, said fitting comprising a socket with an internally threaded section and an internal conical gripping surface adapted to surround said covering; a body member with one end formed with an external conical gripping surface for cooperating in spaced relationship with said internal gripping surface and adapted to be positioned between the ends of said tube and said covering, external thread means on said body member adapted to be screwed into the threaded section of said socket for moving said body member into said socket into said spaced relationship for gripping the end of the covering between said conical gripping surfaces, a fluid passage through said body member terminating at said one end in a cylindrical counterbore and having internal threads formed over at least a median region, at least one annular rib formed on the lateral wall of said counterbore intermediate the ends thereof and extending radially inwardly to terminate in a relatively sharp edge, the other end of said body member being arranged for coupling to a mating fitting; and a nipple, said nipple having a fluid passage therethrough, a relatively smooth outer surface along one end for entering the end of said tube for a distance substantially equal to the axial length of said counterbore, external thread means along the other end for engaging said internal threads in the body member upon insertion in the passage of the body member from the said other end thereof, and tool engaging means for enabling the use of a torque imparting tool for threading the nipple into the body member against the resistance due to compression of the end of the tube; said body member including means for arresting the insertion of said nipple when the end which enters the tube is approximately opposite the end of said body member, said nipple being arranged to be wholly contained within said fluid passage of the body member whereby any fluid passing between the outer surface of the nipple and the inner surface of the tube will be provided with a return path to the main fluid path between the internal threads on said body member and the external thread means on said nipple, the height of said annular rib being proportioned relative to the radial clearance between the lateral wall of the counterbore and the nipple so as to embed in the wall of said tube and obtain a grip thereupon adequate to resist separation of the fitting from the hose should the grip upon the covering be lost, the cooperation between said counterbore and said smooth outer surface of the nipple being such as to establish additionally a fluid seal on the end of the tube.

3. A tamper-proof fitting according to claim 2, wherein the internal threads formed over at least a median region of the fluid passage through said body member are of such axial length and so positioned that they are engaged by the external thread means of said nipple before the smooth end of the nipple enters the counterbore area of said body member.

4. A tamper-proof fitting according to claim 2, wherein the height of the annular rib is equal to at least 20% of the wall thickness of the tube of the hose for which the fitting is intended.

References Cited in the file of this patent

UNITED STATES PATENTS

| | | |
|---|---|---|
| 1,389,997 | Sedgwick | Sept. 6, 1921 |
| 2,266,211 | Kaiser | Dec. 16, 1941 |
| 2,731,279 | Main | Jan. 17, 1956 |
| 2,809,056 | Kaiser | Oct. 8, 1957 |
| 2,833,567 | Bacher | May 6, 1958 |
| 2,853,319 | Press | Sept. 23, 1958 |
| 2,877,027 | Bagnell | Mar. 10, 1959 |

FOREIGN PATENTS

| | | |
|---|---|---|
| 1,032,986 | Germany | June 26, 1958 |